United States Patent [19]
Pratt et al.

[11] Patent Number: 5,805,811
[45] Date of Patent: Sep. 8, 1998

[54] DYNAMIC ELECTRONIC MAIL FACILITY FOR APPLICATIONS EXECUTING IN AN INTEGRATED OPERATING ENVIRONMENT

[75] Inventors: John M. Pratt, Atkinson, N.H.; Garry W. Sager, Ashburnham, Mass.

[73] Assignee: Wang Laboratories, Inc., Billerica, Mass.

[21] Appl. No.: 611,957

[22] Filed: Mar. 6, 1996

Related U.S. Application Data

[63] Continuation of Ser. No. 223,933, Apr. 13, 1994, abandoned.

[51] Int. Cl.$^6$ .................................................. G06F 13/14
[52] U.S. Cl. .............................. 395/200.36; 395/200.34; 395/682
[58] Field of Search ........................ 395/200.34, 200.36, 395/682

[56] References Cited

U.S. PATENT DOCUMENTS

| | | | |
|---|---|---|---|
| 5,153,909 | 10/1992 | Beckle et al. | 379/265 |
| 5,252,951 | 10/1993 | Tannenbaum et al. | 345/156 |
| 5,363,507 | 11/1994 | Nakayama et al. | 345/330 |
| 5,371,675 | 12/1994 | Grief et al. | 707/503 |
| 5,404,528 | 4/1995 | Mahajan | 395/685 |
| 5,412,772 | 5/1995 | Monson | 345/335 |
| 5,416,901 | 5/1995 | Torres | 345/348 |

OTHER PUBLICATIONS

Darryl K. Taft, "PRODEA 'Open Systems' Tool Links Apps with Mouse Click," CMP Publication, Aug. 23, 1993.

*Primary Examiner*—Daniel H. Pan
*Assistant Examiner*—John Follansbee
*Attorney, Agent, or Firm*—Ronald J. Paglierani; Gary D. Clapp

[57] ABSTRACT

An electronic mail facility for dynamically adding a direct electronic mail capability to applications programs in a computer system having an integrated operating environment and connected to a plurality of electronic mail systems and including mail modules providing a drivers and interfaces to the mail systems, an administrative module, a user interface and a data interface. The administrative module includes a mail system manger including a mail system detector for detecting each of the mail systems and a mail system table for selecting and enabling a current one of the electronic mail modules and an application program manager for detecting the invocation of an application program to be supported by the electronic mail facility. The user interface includes user interface modifiers, each including a user interface representation of an electronic mail operation and an electronic mail procedure, including resources, scripts and macros, and drag and drop icons. The user interface is to an application invocation by modifying the user interface of the executable copy of the invoked application program to include the user interface representation of an electronic mail operation. The modified executable copy of the application program is responsive to a user invocation of an electronic mail operation for invoking the corresponding electronic mail procedure. The data interfaces include the data transfer functions of the integrated operating environment and are responsive to the mail procedures for communicating data from the application program to the current mail interface module.

18 Claims, 1 Drawing Sheet

DYNAMIC ELECTRONIC MAIL FACILITY FOR APPLICATIONS EXECUTING IN AN INTEGRATED OPERATING ENVIRONMENT

CROSS REFERENCES TO RELATED APPLICATION

This patent application is related to: The present Patent Application is a Continuation Patent Application of U.S. patent application Ser. No. 08/223,933 by Pratt et al. for DYNAMIC ELECTRONIC MAIL FACILITY FOR APPLICATIONS EXECUTING AN INTEGRATED OPERATING ENVIROMENT, filed Apr. 13, 1994 and since abandoned.

FIELD OF THE INVENTION

The present invention relates to a method and apparatus for providing an electronic mail system and, in particular, to a method and apparatus for providing an electronic mail facility for applications programs executing in an integrated operating environment.

BACKGROUND OF THE INVENTION

Recent years have seen the development and adoption of integrated operating environments, such as Microsoft Windows[1] and New Wave[2], for virtually all computer systems wherein an integrated operating environment is comprised of operating system functions together with a plurality of other functions, such as user interface and data exchange and integration functions, which may be used in common by applications programs written to execute in the integrated operating environment. Integrated operating environments thereby allow the use of common functions among many application programs, rather than the provision of a full set of common functions for each individual application program, provide improved interoperability, compatibility and communication between applications programs, and provide an environment wherein the applications programs are encouraged to adopt common user conventions. Integrated operating environments are thereby more efficient in use of system resources and provide a simpler user interface which is significantly easier to understand and use.

[1]Microsoft and Windows are trademarks of Microsoft Corporation.
[2]New Wave is a trademark of Hewlett-Packard Corporation.

Parallel with the development and adoption of integrated operating environments has been the development and widespread adoption of electronic mail systems, such as local and wide area networks, whereby users may communicate data and other information between the user's system and another system or device. A recurring problem, however, is that the electronic mail programs have not been integrated into the integrated operating environments to any significant or useful extent. As a result, the use of electronic mail systems remains difficult for the user, often requiring complex operations that may differ significantly from mail system to mail system and, while some applications programs may include limited electronic mail capabilities, others have no electronic mail capability. Still further, those applications programs which have some electronic mail capability are usually designed to operate with a single electronic mail system or a very limited selection of electronic mail programs and either cannot operate with other electronic mail systems or can do so only with great difficulty.

SUMMARY OF THE INVENTION

The present invention provides an electronic mail facility for dynamically adding a direct electronic mail capability to applications programs in a computer system connected to a plurality of electronic mail systems and that includes a plurality of permanently resident applications programs, a memory and processor for storing and executing executable copies of the application programs, and an integrated operating environment.

The electronic mail facility includes a plurality of electronic mail modules, each electronic mail module corresponding to an electronic mail system and providing a driver and interface for communication with the corresponding electronic mail system, an administrative module, a user interface and a data interface.

The administrative module includes a mail system manger for selecting and enabling a current one of the electronic mail modules and an application program manager for detecting the invocation of an application program for execution and generating an invocation output indicating the invocation and identity of the invoked application program when the invoked application program is an application program which is to be supported by the electronic mail facility.

The user interface includes a plurality of user interface modifiers, each including a user interface representation of an electronic mail operation and an electronic mail procedure, and responsive to an invocation output by modifying the user interface of the executable copy of the invoked application program to include the user interface representation of an electronic mail operation. An executable copy of an application program having a modified user interface is then responsive to a user invocation of an electronic mail operation for invoking the corresponding electronic mail procedure and the data interface is responsive to each electronic mail procedure for communicating data from the application program to the current mail interface module.

The mail system manger further includes a mail system detector for detecting each of the electronic mail systems connected from the computer system and a mail system table connected from the mail system detector for storing electronic mail system entries, each electronic mail system entry corresponding to and identifying an electronic mail system connected from the computer system. The mail system table in turn provides an output for selecting and enabling a current one of the electronic mail modules.

The application program manager further includes an application program detector for detecting application programs installed in the system and an application program table connected from the application program detector for storing application program entries, each application program entry corresponding to and identifying an application program to be supported by the electronic mail facility. The application program manager further includes an application program monitor for detecting the invocation of an application program for execution and generating an invocation output to the user interface indicating the invocation and identity of an application program when the invoked application program is to be supported by the electronic mail facility.

Further according to the present invention, each user interface modifier corresponds to an application program to be supported by the electronic mail facility and the user interface modifiers include user interface modification resources for modifying the user interface resources of the corresponding application program, scripts and macros, and icons representing target destinations for drop and drag data transfer operations. The data interfaces in turn include the data transfer functions of the integrated operating environment.

In further embodiments of the invention, each electronic mail system includes a user database for storing the identities and locations of users connected from the electronic mail system and the administrative module further includes a recipient selector for reading and displaying the contents of the user database of the electronic mail system corresponding to the current electronic mail module, wherein the recipient selector is responsive to a user input selecting at least one user from the user database of the electronic mail system corresponding to the current electronic mail module for directing the electronic mail module to execute an electronic mail operation with respect to the selected at least one user.

The electronic mail facility of the present invention thereby provides an integrated electronic mail capability to the various applications programs resident in the system wherein the electronic mail facility utilizes the native functions of the integrated operating environment to fully integrate the electronic mail capability into the integrated environment. The electronic mail facility of the present invention thereby interfaces with and communicates with the application programs in the same manner as the application programs are enabled to interface and communicate with each other by the integrated operating environment.

The mail facility of the present invention thereby provides improved interoperability, compatibility and communication between applications programs and the electronic mail systems and provides an environment wherein the applications programs are provided with a common electronic mail interface using the common user conventions of the integrated operating environment. The mail facility of the present invention is thereby more efficient in use of system resources and provide a simpler user interface which is significantly easier to understand and use.

The electronic mail facility of the present invention further provides a means by which each application program may have full access to the entire range of electronic mail system connected to the computer system, including both application programs which individually support only a limited range of electronic mail systems and application programs which have no native electronic mail capability.

Other features, objects and advantages of the present invention will be understood by those of ordinary skill in the art after reading the following descriptions of a present implementation of the present invention, and after examining the drawings, wherein:

DETAILED DESCRIPTION

A. General Description (FIG. 1)

Figure 1:
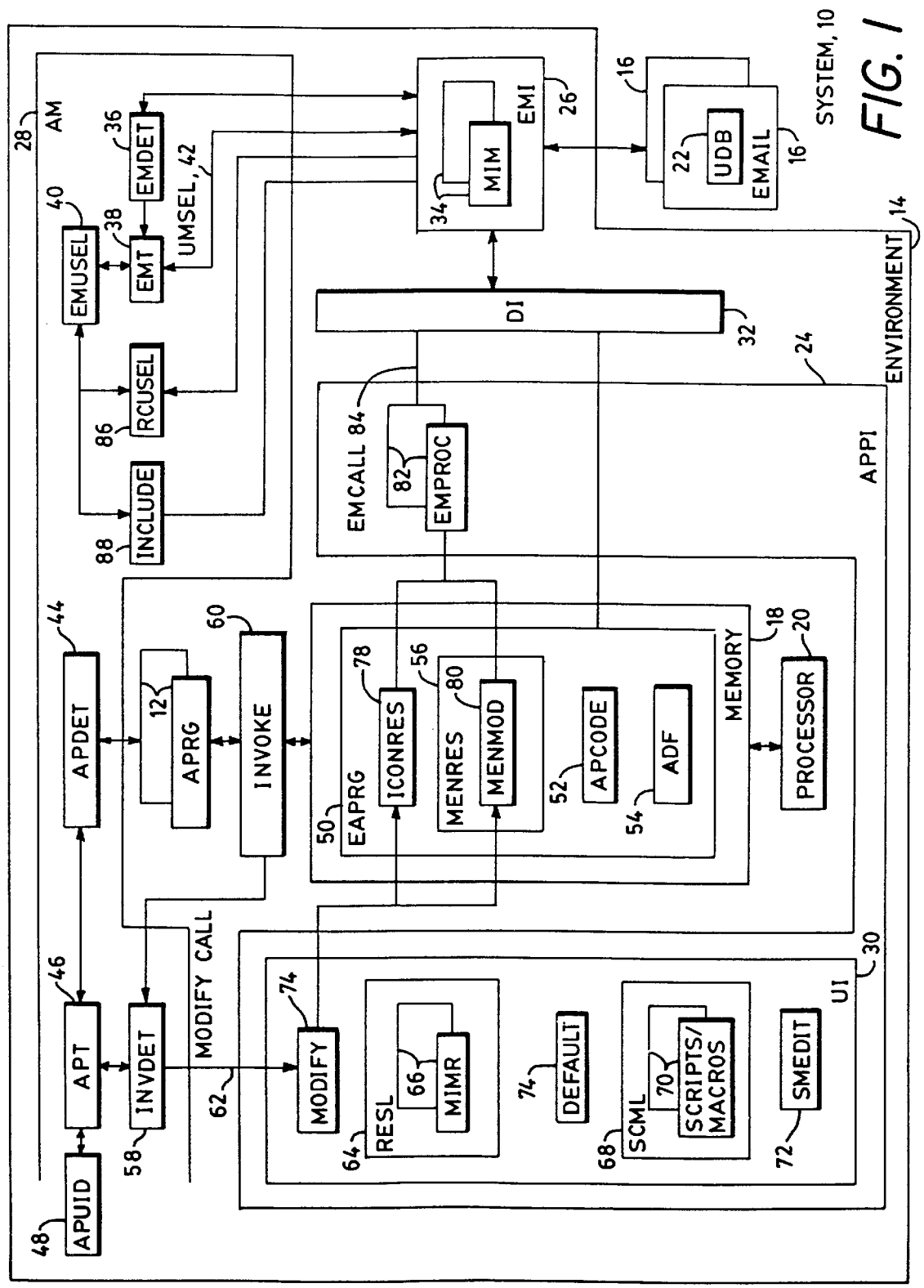
FIG. 1. is a diagrammatic representation of the system of the present invention.

Referring to FIG. 1, therein is presented a diagrammatic representation of a System 10 implementing the electronic mail system of the present invention. As will be described below, the present invention provides a means for dynamically adding a direct electronic mail capability to applications programs, such a word processing, database and spreadsheet programs, running in an integrated operating system environment, such as Microsoft Windows, without modifying the permanently resident functional code of the applications programs.

As represented in FIG. 1, System 10 includes a plurality of Applications Programs (APRGs) 12 executing in an integrated operating system Environment 14 and one or more Electronic Mail Programs (EMAILs) 16.

APRGs 12 as represented in FIG. 1 are comprised of the permanently resident copies of the applications programs as may be stored, for example, on a disk drive in System 10. As will be described further below, temporary copies of APRGs 12 will be made in System 10 Memory 18 space for execution on a System 10 Processor 20. It is assumed for purposes of the following description that individual ones of APRGs 12 may have electronic mail capabilities capable of operating with many or all of EMAILs 16 while others of APRGs 12 may not have electronic mail capabilities or may have electronic mail capabilities capable of operating with only certain ones of EMAILs 16.

EMAILS 16 in turn are comprised of various local and wide area electronic mail system programs available within or accessible to Environment 14, such as Lotus[3] CC:Mail, Lotus Notes, Microsoft Mail[4] and DaVinci eMail[5], and similar electronic mail systems which may become available in the future. Each such electronic mail program is generally comprised of a locally resident program within System 10, represented by EMAILs 16, with locally resident communications hardware facilities, such as modems, and elements resident outside of System 10, such as in a central system, a network, or other systems with which System 10 communicates. The structure, capabilities, functions and operations of such electronic mail systems are generally well known to those of skill in the relevant arts and are fully described in the documentation available from manufacturers of such electronic mail systems and will not be described in further detail herein. For purposes of the present description of the electronic mail system, however, it will be noted that such electronic mail systems generally include a User Database (UDB) 22 which may be queried by a user or a system to identify the users, such as possible electronic mail recipients, connected to the electronic mail system and the addresses or locations of such users on the electronic mail systems. A UDB 22 may be either resident in the corresponding EMAIL 16 or accessible through the EMAIL 16 and for convenience is represent in FIG. 1 as functionally within the corresponding EMAIL 16.

[3]Lotus, CC:Mail and Notes are trademarks of Lotus Corporation.
[4]Microsoft Mail is a trademark of Microsoft Corporation.
[5]DaVinci and eMAIL are trademarks of Da Vinci Corporation.

Environment 14 is comprised of Microsoft Windows in the presently preferred embodiment of the invention and the following description of the electronic mail system of the present invention will assume Microsoft Windows as Environment 14, together with the functionality and capabilities of Microsoft Windows as used to implement the present electronic mail system. The functionality and capabilities of Microsoft Windows are well known to those in the relevant arts and is well described in readily available publications, such as "Windows 3.1 Programmer's Reference" by James W. McCord and published by Que Corporation and "Inside OLE 2" by Kraig Brockschmidt and published by Microsoft Press. Those of skill in the relevant arts will readily understand from the following description of the present invention how to adapt the present invention to other operating system environments, such as New Wave and Macintosh[6].

[6]Macintosh is a trademark of Apple Computer Corporation.

The electronic mail facility of the present invention also executes in Environment 14, in Memory 18 space and on Processor 20, and is comprised of an Applications Interface (APPI) 24, an Electronic Mail Interface (EMI) 26 and an Administrative Module (AM) 28.

APPI 24 is comprised of a User Interface (UI) 30 which dynamically modifies the applications program user interfaces to provide the facility for invoking the mail facility and a set of Data Interfaces (DIs) 32 for facilitating the transfer of data or files between an applications program and the administrative module and mail interface modules.

As will be described below, UI 30 modifies the menus of the applications programs by inserting an electronic mail menu pick and corresponding command line to invoke the mail facility. UI 30 further includes, for example, the capability of inserting an electronic mail facility "drag and drop" icon interface specifically for use with applications programs which implement the "drag and drop" facility of Microsoft Windows, such as the Windows File Manager.

In the present implementation of the present electronic mail facility, DI 32 utilizes the existing data transfer capabilities of the APRGs 12 to implement the transfer of the data or files to be mailed from the applications programs to EMAILs 16 through EMI 26.

It should be noted that UI 30 and DI 32 do not modify the permanently resident copies of the applications programs, that is, the APRG 12 copies of the applications programs resident on the system disk. UI 30 and DI 32 instead dynamically modify only the executed memory resident copies of the APRGs 12 that are created by System 10 when the applications programs are invoked by the users.

EMI 26 includes a Mail Interface Module (MIM) 34 for each EMAIL 16 to be supported by the electronic mail facility of the present invention. Each MIM 34 is a driver/interface designed specifically from the published interface specifications of the corresponding EMAIL 16 to provide the control and data transfer interface required by the corresponding EMAIL 16.

Finally, AM 28 provides overall control of the mail facility, such as detecting the EMAILs 16 available to the system, detecting the APRGs 12 installed in System 10 and designating which of APRGs 12 are to be provided with the capabilities of the present electronic mail facility. Other functions include providing user control functions and mail database services, such as searching the system addresses of recipients in UDBs 22.

B. Detailed Description (FIG. 1)

1. Administration Module (AM) 28

As shown in FIG. 1, AM 28 includes an EMAIL Detect (EMDET) 36 for detecting the EMAIL 16 communications programs known and executing in Environment 14 or available or accessible to APRGs 12 executing in Environment 14 EMDET 36 may, for example, scan Environment 14's application program registration database and program initiate files to identify the programs in Environment 14 which are characterized as electronic mail programs.

EMDET 36 will use the results of the detection operations to construct entries in an EMAIL Table (EMT) 38 wherein each EMT 38 corresponds to and identifies an available EMAIL 16 and the characteristics of the corresponding EMAIL 16. EMT 38 further includes an EMAIL User Select Interface (EMUSEL) 40 for displaying the contents of EMT 38 to the user. A user may identify EMAIL 16s which have not been detected by EMDET 36 by constructing appropriate corresponding entries in EMT 38 through EMUSEL 40 and may edit or modify existing EMT 38 entries through EMUSEL 40.

EMT 38 in turn provides an EMAIL 15 Select Output (EMSEL) 42 to EMAILs 16 to enable a current one of EMAILs 16, wherein the EMAIL 16 enabled by EMSEL 42 will be used for all electronic mail communications until another EMAIL 16 is selected by a change in EMSEL 42. In this regard, the AM 28 will generally select the first detected EMAIL 16 as the default EMAIL 16 for use by System 10. The user, however, may use EMUSEL 42 to select any EMAIL 16 having an entry in EMT 38 as the current EMAIL 16.

AM 28 further includes a corresponding facility for identifying the APRGs 12 resident in System 10, including a Application Program Detection (APDET) 44 which, for example, scans the Environment 14 program registration database and program initiate files to identify the APRGs 12 and their characteristics, including the electronic mail capabilities of the APRGs 12, and construct corresponding entries in an APRG Table (APT) 46. Associated with APT 46 is an APRG User Identification Interface (APUID) 48 for displaying the contents of APT 46. The user may use APUID 48 to identify further APRGs 12 which may not have been detected by APDET 44, and their characteristics, by constructing corresponding entries in APT 46 and may use APUID 48 to edit or modify existing APT 46 entries.

As has been described, APRGs 12 are comprised of the permanently resident copies of the applications programs as may be stored, for example, on a disk drive in System 10. Temporary copies of APRGs 12, represented in FIG. 1 by Executing Applications Programs (EARPGs) 50, will be made in System 10 Memory 18 space for execution on a System 10 Processor 20 when the APRGs 12 are invoked for execution.

As represented in FIG. 1, an unmodified EAPRG 50 in the Windows environment of Environment 14 is usually comprised of the Application Executable Code (APCODE) 52 and one or more Application Data Files (ADFs) 54 being operated upon by the APCODE 52 under the direction of a user. An application will include, as part of its user interface, one or more menus or icons presenting actions that the user can direct the application to perform wherein the menus or icons are implemented as Menu Resources (MENRES) 56 associated with the application program.

As described, and as described further below, UI 30 dynamically modifies EARPGs 50 by inserting electronic mail menu picks and/or icons when the applications programs are invoked for execution. For this reason, AM 28 includes an APRG Invocation Detect (INVDET) 58 which monitors Invocation Operations (INVOKE) 60 occurring in Environment 14 each time an APRG 12 is invoked for execution, identifies the APRG 12 being invoked, and compares the invoked APRG 12 with the entries of APT 46 to determine whether APT 46 contains an entry corresponding to the invoked APRG 12. If a match is found between the invoked APRG 12 and an APT 46 entry, indicating that the invoked APRG 12 is supported with the electronic mail communications capability provided by the electronic mail facility of the present invention, INVDET 58 generates a Modify Call 62 to APPI 24 to cause APPI 24 to modify the menu/icon user interface of the corresponding EAPRG 50.

2. Applications Interface (APPI) 24

The specific Modify Call 62 and corresponding operation performed by APPI 24 in modifying the menu/icon user interface of an EAPRG 50 will depend upon the specific EAPRG 50, but will fall within one of a few classes of operations, each of which will be well understood by those of skill in the relevant arts. In one instance, such as a Windows compatible application program with the user interface menus and icons defined and generated by resource files, Modify Call 62 will take the form of an Application Program Interface (API) call, such as ModifyMenu or the equivalent for the insertion of an icon into an application window, and APPI 24 will perform the corresponding Windows defined operations to modify the menu/icon user interface. In other instances, the menu/icon user interface is defined within the application program executable code, and an Environment 14, such as Windows, will contain corresponding calls procedures for modifying the user interface contained in the application executable code. In yet other instances, the application program will support scripting or macros, that is, the use of user defined and written programs for controlling certain aspects of the application program operation, and corresponding procedures for inserting menu picks or icons for invoking such scripts or macros.

As indicated in FIG. 1, in the presently preferred embodiment APPI 24 includes a plurality of user interface modifiers, including a Resource Library (RESL) 64 of Menu/Icon Modification Resources (MIMRs) 66 for use with those application programs having menus and icons defined in Environment 14 resources and a Script/Macro Library (SCML) 68 of Scripts/Macros 70 for use with those applications supporting scripting and macros. At least some of MIMRs 66 and Scripts/Macros 70 may be provided by the vendor of the electronic mail facility for common and popular applications programs directly supported by the electronic mail facility while others, and in particular others of Scripts/Macros 70, may be provided or generated by the users. For this purpose, APPI 24 further includes a Script/Macro Editor (SMEDIT) 72 of the type well known in the art for generation of scripts and macros by the users. In addition, various of the applications programs provide native scripting and macro writing editors and these native editors may be used to generate menu/icon user interface modification scripts and macros in the same manner as SMEDIT 72. Finally, APPI 24 will include at least one Default Script/Macro (DEFAULT) 74 for use with applications programs which do not support scripting or macros.

As represented in FIG. 1, Modify Call 62, which includes an identification of the invoked application program, is received by Menu Modify (Modify) 76 which interprets the Modify Call 62 to select the appropriate corresponding one of MIMR 66, Scripts/Macros 70 or DEFAULT 74 and to modify the menu/icon user interface of the EAPRG 50 accordingly. An example of this modification of the menu/icon user interface of the newly invoked EAPRG 50 is represented in FIG. 1 by the association of an Icon Resource (ICONRES) 78 with the EAPRG 50 and a Menu Modification (MEMMOD) 80 with the MENRES 56 of the EAPRG 50.

Each ICONRES 78 and MEMMOD 80 includes a user interface representation of an electronic mail and operation, an MEMMOD 80 in the form of an addition to the application menus and an ICONRES 78 in the form of an icon appearing in the application user interface. ICONRES 78 may also function as a destination target for "drag and drop" operations as implemented in applications programs supporting drag and drop operations in Windows and similar Environments 14.

In this regard, and considering the use of MEMMOD 80 and ICONRES 78 as menu pick modifications to the application user interface, it is well understood that applications programs represent data from ADFs 84 either directly or symbolically. Data represented directly appears as a representation of the data in the user interface display, such as the text of a word processing document or the cells of a spreadsheet. Data represented symbolically is usually represented by icons representing ADFs 84, for example, as file icons in Windows File Manager or as drawing file icons in CorelDRAW[7].

[7]CorelDRAW is a trademark of Corel Corporation.

In either instance, Environment 14 and the application programs generally provide a variety of methods for a user to indicate data to be operated upon. Examples of such would include using mouse functions to highlight portions of a text or cells in a spreadsheet or to select an icon representing a data file or, by clicking on the menu pick representing an operation to be performed, to thereby indicate that an operation is to be executed on the entirety of the ADF 54 currently being operated upon by the application program. The user will then indicate the operation to be performed by "clicking" on the menu pick representing the operation, in this instance the transmittal of the indicated data or file through the electronic mail facility, and the application will call the functions necessary to execute the indicated operation.

In the specific instance of applications supporting drag and drop operations, the user will indicate the source of the data to be operated upon, again by using mouse functions to highlight the data or by "clicking" on an icon representing the ADF 54 to be operated upon, which will result in the generation of a mouse cursor representing the selected data. The mouse functions are then used to "drag" the cursor representing the selected data to an icon representing a destination target and "dropped" wherein, in this instance, the destination target icon represents the electronic mail facility. The application will then again call the functions necessary to execute the indicated operation. In this regard, it should be noted that certain applications programs, such as Windows File Manager, allow the selection of multiple data items to be operated upon, and that such multiple selection of data items is supported by the present electronic mail facility so that multiple data items may be communicated in a single electronic mail operation.

Associated with each MENMOD 80 or ICONRES 78 is an EMAIL Procedure (EMPROC) 82 that is generated with and as a part of the corresponding MIMR 66, Scripts/Macros 70 or DEFAULT 74. The invoking of a menu pick or drag and drop operation by a user through the corresponding ICONRES 78 or MEMMOD 80 will result in the invocation of the corresponding EMPROC 82 which will in turn generate a EMAIL Call (EMCALL) 84 to DI 32, together with an identification of the data selected to be transmitted through the electronic mail facility.

3. Data Interface (DI) 32

In the presently preferred embodiment of the electronic mail system of the present invention, DI 32 is comprised of the data transfer functions normally provided within Environment 14 and operate in response to EMCALL 84 and the identification of data to transfer the selected data to the electronic mail facility and, in particular, to the MIM 34 currently selected by EMSEL 42. In the present embodiment, for example, wherein Environment 14 is Microsoft Windows, DI 32 will include Window's Dynamic Data Exchange (DDE), Object Linking and Embedding (OLE 2.0), drag and drop, and the automation support provided in OLE 2.0 through data objects. The use and operations of such native data transfer facilities is well known to those of skill in the relevant arts and as such will not be discussed further herein.

Returning finally to AM 28, AM 28 supports two further functions of the electronic mail facility of the present invention. Recipient Select (RCVSEL) 86 reads the UDB 22 of the EMAIL 16 corresponding to the MIM 34 currently selected by EMSEL 42 and, through EMUSEL 40, displays potential recipients of an electronic mail operation to the user, including providing full search capabilities to allow a user to search for, identify, locate and select the recipients of a present electronic mail operation. Again, the use and operation of user databases in electronic mail systems is well understood by those of skill in the art and will not be discussed further herein.

Finally, Include 88, which includes a user interface through EMUSEL 40, provides a facility through which a user may select and identify subjects to be included with the selected data being transmitted through an electronic mail operation. Subjects may include cover sheets or letters, either generated by an editor included in Include 88 or selected from text files generated with a word processing application program. Again, the generation and use of subjects in electronic mail systems is well understood by those of skill in the art and will not be discussed further herein.

While the invention has been particularly shown and described with reference to preferred embodiments of the apparatus and methods thereof, it will be also understood by those of ordinary skill in the art that various changes, variations and modifications in form, details and implementation may be made therein without departing from the spirit and scope of the invention as defined by the appended claims. Therefore, it is the object of the appended claims to cover all such variation and modifications of the invention as come within the true spirit and scope of the invention.

What is claimed is:

1. In a computer system including a plurality of permanently resident application programs having a corresponding plurality of application user interfaces, a memory and processor for storing and executing executable copies of the application programs, and an integrated operating environment and connected to a plurality of electronic mail systems, an electronic mail facility for dynamically adding a direct electronic mail capability to selected ones of the applications programs not previously having a direct electronic mail capability, comprising:

a plurality of electronic mail modules, each electronic mail module corresponding to an electronic mail system and providing a driver and interface for communication with the corresponding electronic mail system, an administrative module, including
a mail system manager for selecting and enabling a current one of the electronic mail modules,
an application program manager for automatically detecting an invocation of an application program by a user for execution of the application program and automatically generating an invocation output indicating the invocation and identity of the invoked application program that is to be automatically provided with an electronic mail capability by the electronic mail facility wherein the electronic mail capability is a new functionality to the invoked application program, a mail facility user interface, including
a plurality of user interface modifiers, each including a user interface representation of an electronic mail operation and an electronic mail procedure,
the mail facility user interface being automatically responsive to an invocation output of the application program manager for automatically modifying one of the corresponding application user interfaces of an executable copy of the invoked application program to include the user interface representation of an electronic mail operation, wherein
the executable copy of an application program having a modified user interface is responsive to a user invocation of an electronic mail operation for automatically invoking a corresponding electronic mail procedure, and a data interface responsive to an electronic mail procedure for communicating data from the application program to a current mail interface module.

2. The electronic mail facility of claim 1, the mail system manger further comprising:

a mail system detector for detecting each of the electronic mail systems connected from the computer system, and
a mail system table connected from the mail system detector for storing electronic mail system entries, each electronic mail system entry corresponding to and identifying an electronic mail system connected from the computer system,
the mail system table providing an output for selecting and enabling a current one of the electronic mail modules.

3. The electronic mail facility of claim 1, the application program manager further comprising:

an application program detector for detecting application programs installed in the system,
an application program table connected from the application program detector for storing application program entries, each application program entry corresponding to and identifying an application program to be supported by the electronic mail facility, and
an application program monitor for detecting the invocation of an application program for execution and generating an invocation output indicating the invocation and identity of an invoked application program supported by the electronic mail facility.

4. The electronic mail facility of claim 1 wherein each user interface modifier corresponds to an application program to be supported by the electronic mail facility.

5. The electronic mail facility of claim 4 wherein the user interface modifiers include user interface modification resources for modifying the user interface resources of the corresponding application program.

6. The electronic mail facility of claim 4 wherein the user interface modifiers include scripts and macros.

7. The electronic mail facility of claim 4 wherein the user interface modifiers include icons representing target destinations for drop and drag data transfer operations.

8. The electronic mail facility of claim 1 wherein the data interfaces include the data transfer functions of the integrated operating environment.

9. The electronic mail facility of claim 1 wherein each electronic mail system includes a user database for storing the identities and locations of users connected from the electronic mail system and the administrative module further comprises:

a recipient selector for
reading and displaying the contents of the user database of the electronic mail system corresponding to the current electronic mail module, wherein
the recipient selector is responsive to a user input selecting at least one user from the user database of the electronic mail system corresponding to the current electronic mail module for directing the electronic mail module to execute an electronic mail operation with respect to the selected at least one user.

10. In a computer system including a plurality of permanently resident application programs having a corresponding plurality of application user interfaces, a memory and processor for storing and executing executable copies of the application programs, and an integrated operating environment and connected to a plurality of electronic mail systems, a method for dynamically adding a direct electronic mail capability to selected ones of the applications programs not previously having a direct electronic mail capability, comprising the steps of:

providing a plurality of electronic mail modules, each electronic mail module corresponding to an electronic mail system and providing a driver and interface for communication with the corresponding electronic mail system, providing a plurality of user interface modifiers, each including a user interface representation of an electronic mail operation and an electronic mail procedure by operation of a mail system manager, automatically selecting and enabling a current one of the electronic mail modules, by operation of an application program manager, automatically detecting an invocation of an application program by a user for execution of the application program and automatically generating an invocation output indicating the invocation and identity of the invoked application program that is to be automatically provided with an electronic mail capability by the electronic mail facility wherein the electronic mail capability is a new functionality to the invoked application program, by operation of a user interface being automatically responsive to an invocation output of the application program manager for automatically modifying one of the corresponding application user interfaces of an executable copy of the invoked application program to include a user interface representation of an electronic mail operation, wherein the executable copy of an application program having a modified user interface is responsive to a user invocation of an electronic mail operation for invoking a corresponding electronic mail procedure, and by operation of a data interface responsive to an electronic mail procedure for communicating data from the application program to a current mail interface module.

11. The method for dynamically adding a direct electronic mail capability to selected ones of the applications programs of claim 10, wherein the step of selecting and enabling a current one of the electronic mail modules further comprises the steps of:

by operation of a mail system detector, detecting each of the electronic mail systems connected from the computer system, constructing a mail system table connected from the mail system detector for storing electronic mail system entries, each electronic mail system entry corresponding to and identifying an electronic mail system connected from the computer system, and by operation of the mail system table, providing an output for selecting and enabling a current one of the electronic mail modules.

12. The method for dynamically adding a direct electronic mail capability to selected ones of the applications programs of claim 10, wherein the steps of detecting the invocation of an application program for execution and generating an invocation output indicating the invocation and identity of an invoked application program supported by the electronic mail facility further comprise the steps of:

by operation of an application program detector, detecting application programs installed in the system, constructing an application program table connected from the application program detector for storing application program entries, each application program entry corresponding to and identifying an application program to be supported by the electronic mail facility, and by operation of an application program monitor, detecting the invocation of an application program for execution and generating an invocation output indicating the invocation and identity of an invoked application program supported by the electronic mail facility.

13. The method for dynamically adding a direct electronic mail capability to selected ones of the applications programs of claim 10 wherein each user interface modifier corresponds to an application program to be supported by the electronic mail facility.

14. The method for dynamically adding a direct electronic mail capability to selected ones of the applications programs of claim 13 wherein the user interface modifiers include user interface modification resources for modifying the user interface resources of the corresponding application program.

15. The method for dynamically adding a direct electronic mail capability to selected ones of the applications programs of claim 13 wherein the user interface modifiers include scripts and macros.

16. The method for dynamically adding a direct electronic mail capability to selected ones of the applications programs of claim 13 wherein the user interface modifiers include icons representing target destinations for drop and drag data transfer operations.

17. The method for dynamically adding a direct electronic mail capability to selected ones of the applications programs of claim 10 wherein the data interfaces include the data transfer functions of the integrated operating environment.

18. The method for dynamically adding a direct electronic mail capability to selected ones of the applications programs of claim 10 wherein each electronic mail system includes a user database for storing the identities and locations of users connected from the electronic mail system, further comprising the steps of:

reading and displaying the contents of the user database of the electronic mail system corresponding to the current electronic mail module, and responsive to a user input, selecting at least one user from the user database of the electronic mail system corresponding to the current electronic mail module and generating an output directing the electronic mail module to execute an electronic mail operation with respect to the selected at least one user.

* * * * *